United States Patent [19]

Dunnington et al.

[11] 4,266,919
[45] May 12, 1981

[54] RAM-EXTRUSION APPARATUS FOR NON-MELT FABRICABLE POLYMERIC RESINS

[75] Inventors: Gordon B. Dunnington, Wilmington; Carl H. Manwiller, Christiana, both of Del.

[73] Assignee: E. I. Du Pont de Nemours and Company, Wilmington, Del.

[21] Appl. No.: 65,068

[22] Filed: Aug. 9, 1979

[51] Int. Cl.³ .......................... B29F 3/06; B29F 3/014
[52] U.S. Cl. .................................... 425/102; 264/126; 264/176 R; 264/323; 264/337; 425/107; 425/376 R; 425/376 A; 425/436 R; 425/461
[58] Field of Search ................. 425/95, 376 R, 376 A, 425/107, 102, DIG. 115, 436 R, 436 RM, 461; 264/337, 323, 338, 126, 127, 176 R; 249/114

[56] References Cited

U.S. PATENT DOCUMENTS

| 2,736,057 | 2/1956 | Davis et al. ...................... 264/176 R |
| 3,132,379 | 5/1964 | Crane ......................... 425/DIG. 115 |
| 3,249,588 | 5/1966 | Gall ........................................ 528/21 |
| 3,757,718 | 9/1973 | Johnson ................................ 264/323 |
| 3,942,937 | 3/1976 | Prober et al. ........................ 425/461 |
| 3,966,390 | 6/1976 | Nakano et al. ....................... 425/470 |
| 3,995,979 | 12/1976 | Fedrigo .................................. 425/78 |

*Primary Examiner*—Jeffery R. Thurlow

[57] ABSTRACT

In an apparatus for the ram-extrusion of non-melt fabricable polymeric resin comprising means for forcing the resin through a forming die from an extrusion chamber, the improvement wherein the ram head comprises at least about 10 percent fluoropolymer.

4 Claims, 3 Drawing Figures

U.S. Patent May 12, 1981 4,266,919
FIG.1
FIG.2
FIG.3
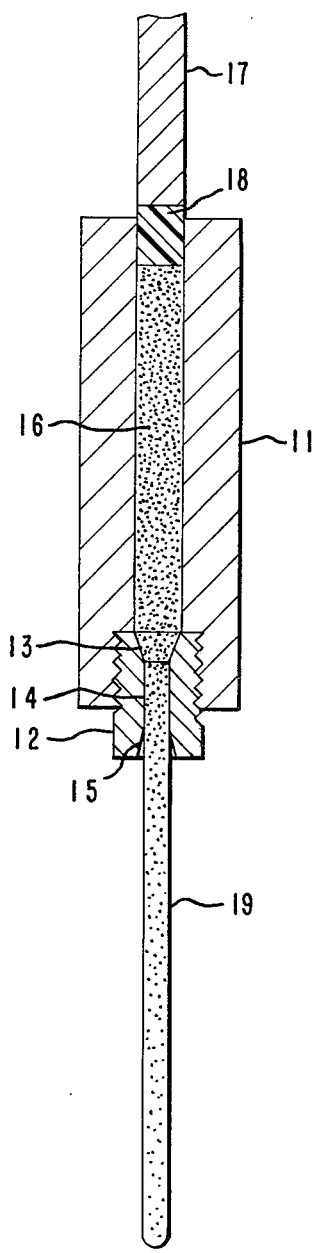
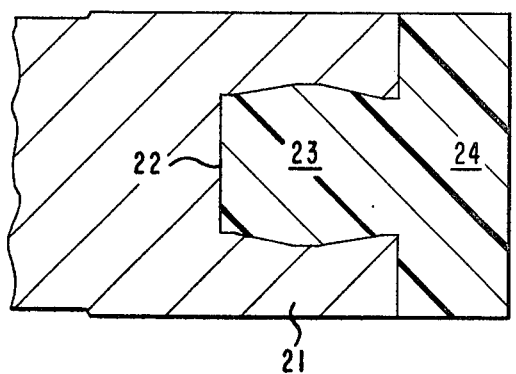
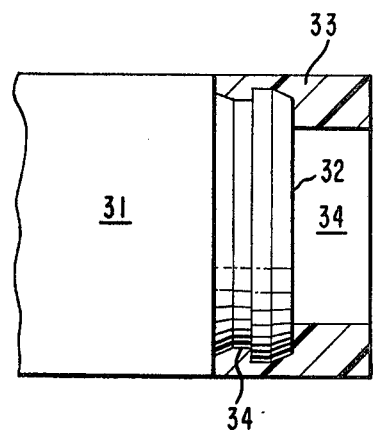

RAM-EXTRUSION APPARATUS FOR NON-MELT FABRICABLE POLYMERIC RESINS

BACKGROUND OF THE INVENTION

Aromatic polyamide and polyimide resins have found wide applicability as shaped articles in applications where unusual strength under high temperature conditions is needed. However, these polymeric materials are non-melt fabricable, since they tend to degrade far below their crystalline melting points. A variety of techniques has therefore been developed to form these polymers into useful shaped articles.

One such forming technique useful for preparing thin polyimide articles such as films involves casting a polymeric intermediate into the desired final configuration before completing the chemical reaction to the aromatic polyimide. Larger molded shapes can be prepared by molding powders of these polymers at elevated temperatures and pressures.

Continuous forming of such polymeric materials has recently been made possible through the invention described in copending application Ser. No. 971,675 filed Dec. 21, 1978 now U.S. Pat. No. 4,238,538 issued Dec. 9, 1980. The invention described therein lies in the use of a die profile which results in compaction, back pressure and pressure relief, consecutively, in a non-melt fabricable polymeric resin forced through the die by a ram. This die design permits the extrusion of a shaped article of a non-melt fabricable polymeric resin which can then be sintered to form a finished article having unusual strength under high temperature conditions.

In the forming apparatus described above, optimum performance is attained by the inclusion of lubricating fillers such as particulate polytetrafluoroethylene in the resin blend. The inclusion of these lubricating components in the resin blend decreases the ram force required in the apparatus. Inclusion of these additives, in continuously formed articles, however, creates other difficulties. The presence of the internal lubricant weakens the final molded product. In addition, the propensity of polytetrafluoroethylene to agglomerate can result in inhomogeneity in the finished products. In extreme cases, agglomerated particles of polytetrafluoroethylene pull out during subsequent machining of a shaped article, leaving voids.

Accordingly, a continuing need exists for an apparatus for forming polymers such as aromatic polyamide and polyimide resins while reducing the need for lubricating additives in the resin blend.

SUMMARY OF THE INVENTION

The instant invention provides an improved apparatus for the molding of melt infusible aromatic polyamide and polyimide resin which reduces or eliminates the need for a lubricating additive in the resin.

Specifically, the instant invention provides, in an apparatus for the ram-extrusion of non-melt fabricable polymeric resin comprising an extrusion chamber, a forming die at the end of the extrusion chamber, and a ram for forcing the resin from the extrusion chamber through the forming die, the improvement wherein the ram head in initial contact with the walls of the extrusion chamber and with the resin is consumable fluoropolymeric material which comprises at least about 10 percent fluoropolymer.

BRIEF DESCRIPTION OF THE DRAWINGS

FIG. 1 is a cross-sectional representation of a typical extrusion apparatus of the present invention.

FIGS. 2 and 3 are cross-sectional representations of ram heads which can be used in the instant invention.

DETAILED DESCRIPTION OF THE INVENTION

The extrusion apparatus used in the present invention is exemplified by that described in detail in Manwiller, U.S. Pat. Application Ser. No. 971,675, filed Dec. 21, 1978 now U.S. Pat. No. 4,238,538, hereby incorporated by reference.

In accordance with the present invention, the ram head is made of a consumable fluoropolymeric material comprising at least about 10% of a fluoropolymer such as polytetrafluoroethylene or polychlorotrifluoroethylene. A particularly satisfactory polytetrafluoroethylene is that commercially available from E. I. du Pont de Nemours and Company as "Teflon" fluoropolymer molding resin. The term "consumable" means that the fluoropolymeric material is abraded on frictional contact with the walls of the extrusion chamber.

The consumable fluoropolymeric material makes up the surface of the ram head that comes in contact with the non-melt fabricable polymeric resin, in addition to the sides of the ram head that come in contact with the inner surface of the barrel at the forward end at the ram. The consumable fluoropolymeric material should preferably comprise at least one quarter inch of the side wall of the ram head at its forward end. While the consumable polymeric material is preferably substantially pure fluoropolymer, the fluoropolymer can be present in a matrix such as aromatic polyamide or polyimide, so long as the fluoropolymer comprises at least about 10 weight percent of the combination of fluoropolymer plus matrix. Suitable fluoropolymer in a polyimide matrix is commercially available, for example, from E. I. du Pont de Nemours and Company as "Vespel 211" polyimide.

The consumable fluoropolymer material can be applied to the ram by any convenient means. For example, a polytetrafluoroethylene ram head can be adhesively bonded onto the end of the ram after pretreatment of the surfaces to be bonded to improve the adhesive capability of the polytetrafluoroethylene, for example, as by sodium etching. In general, however, it is preferred to attach the fluoropolymeric material to the ram head by mechanical interlocking of the two components.

The invention is further illustrated by the accompanying drawings, in which FIG. 1 is a cross-sectional illustration of a representative extrusion apparatus of the present invention. In that figure, extrusion chamber 11 is fitted with extrusion die 12 having compacting zone 13, back pressure zone 14 and relief zone 15. Non-melt fabricable polymeric resin 16 is compacted by ram 17 having a head 18 of a fluoropolymer. The resin is forced, at elevated temperatures and pressures, through the die to form extruded rod 19.

Typical methods of attaching the consumable fluoropolymeric material to the end of the ram are shown in FIGS. 2 and 3. In FIG. 2, ram end 21 has recess 22 formed therein. Into this recess is fitted the fluoropolymeric ram head by forcing stem end into the recess so as to affix head 24 on the end of the ram.

Similar techniques for attaching the ram end can be used with ram configuration such as that shown in FIG.

3. That figure, ram 31 has a flanged end 32 onto which is fitted end cap 33 having a corresponding recess 34 formed therein. The ram of FIG. 3 is hollow to facilitate the extrusion of tubes or other hollow shapes over a core rod.

In the embodiments shown in both FIGS. 2 and 3, the polymeric head is fully in contact with the non-melt fabricable polymeric resin extruded by the ram, and preferably is further designed to be at least one-quarter inch in its longitudinal dimension, so as to contact the barrel walls with which the forward end of the ram surface first comes in contact. In the design of such ram heads, the maximum diameter of the ram head can be slightly smaller than the diameter of the ram itself, since the fluoropolymer resin, in use distorts to fully occupy the inner diameter of the barrel.

The improved apparatus of the present invention is useful in the extrusion molding of a variety of non-melt fabricable polymeric resins. Such resins include high temperature resins such as aromatic polyimides, aromatic polyamides, aromatic polybenzothiazoles, aromatic polybenzoxazoles, aromatic polybenzoylenebenzimidazoles and the like.

A particularly satisfactory aromatic polyimide resin which can be used in the instant apparatus is a substantially linear aromatic polyimide powder having a second order transition temperature of above 500° C. and a room temperature flexural modulus, as molded, of at least 2.1 GPa. Such a resin can be prepared by reacting 4,4'-oxydianiline with pyromellitic dianhydride substantially according to the procedures set forth in U.S. Pat. No. 3,179,631 to Endrey and U.S. Pat. No. 3,249,588 to Gall, the teachings of which are hereby incorporated by reference. Another aromatic polyimide resin that is useful in the practice of this invention is one based on benzophenone tetracarboxylic dianhydride.

A particularly preferred aromatic polyamide resin which can be used in the present invention is the coalescible and densifiable powder of poly(metaphenylene isophthalamide) disclosed in Turnbull U.S. Pat. No. 3,925,323. This powder is produced by adding a solution of poly(metaphenylene iophthalamide) in a solvent of dimethyl formamide or dimethyl acetamide to water to form a slurry. After filtration of the slurry, a filter cake is washed, dried and comminuted resulting in a powder which is coalescible and densifiable. This poly(metaphenylene isophthalamide) powder sinters at a temperature below its crystalline melting point which allows the production of solid and homogeneous shaped articles according to the practice of this invention.

A variety of fillers can be admixed with the particulate non-melt fabricable polymeric resins to be extruded according to the present invention. Such additives can be included to modify, for example, thermal conductivity or abrasive properties or to provide further lubrication in use. Such fillers can include silicon carbide, molybdenum disulfide, cryolite, particulate polytetrafluoroethylene, boron nitride, iron sulfide, sodium chloride, asbestos, clay, mica, vermiculite, metal carbides, kaolin, metal oxides, and graphite, as well as mixtures of such additives.

The instant invention permits the extrusion of non-melt fabricable polymeric resins to give shaped articles of excellent appearance and physical properties at high extrusion rates without incorporation of a lubricating additive into the resin mixture. It is believed that the presence of the fluoropolymer in the ram head, in contacting both the non-melt fabricable polymer as well as the barrel wall, provides a lubrication that facilitates the extrusion operation without the incorporation of a lubricant in the non-melt fabricable resin itself with attendant weakening of the finally molded article.

The invention is further illustrated by the following specific examples. In these examples, a particulate polyimide resin was molded which was prepared from pyromellitic dianhydride and 4,4'-oxydianiline substantially according to the teachings of Gall, U.S. Pat. No. 3,249,588. An extrusion apparatus was used of the type illustrated in FIG. 1, using a polytetrafluoroethylene end on the extrusion ram, attached as shown in FIG. 2.

The equipment used in the extrusion was maintained at a temperature of 200° C., including the extrusion barrel, the die table and extrusion die, as well as the equipment used to transport the particulate polyamide to the extrusion apparatus, including the feed hopper, conveying lines and feed chute. In the extrusion of the particulate polyimide resin, the polymer was introduced into the extrusion apparatus in five stages. After the introduction of each of the first four portions, the resin was compacted with the ram to decrease the volume to one-third of its natural free volume. After addition of the fifth resin portion, the extruder charge was subjected to a sustained extrusion stroke to expel the total resin charge through the extrusion die, after which the process was repeated. The resulting "green" extrudate was then sintered in an oven in a nitrogen atmosphere for three hours at 400° C.

The polyimide resin used in all examples was treated to pelletize the polyimide powder for improved flow characteristics to a particle size of 200–500 microns.

EXAMPLE 1

Polyimide resin containing about 15% graphite was used to extrude 9.5 mm diameter rods of nominal 61 cm lengths. Excellent sustained operation resulted at an extrusion force of 4.5 metric tons. 45 rods were made at a rate of one rod in ninety seconds.

EXAMPLE 2

The general procedure of Example 1 was repeated, except that no graphite was present in the polyimide resin. Excellent sustained operation was obtained at an extrusion force of 3.6–4.5 metric tons in preparing 25 rods.

EXAMPLE 3

The general procedure of Example 1 was repeated except that a die was used that resulted in 15.9 mm diameter rods. Excellent sustained operation was attained in making 25 rods at an extrusion force of 5.4 metric tons.

COMPARATIVE EXAMPLE A

The general procedure of Example 1 was repeated, except that no polytetrafluoroethylene end was used on the ram end, the polyamide resin contained no graphite but included 0.20 weight percent polytetrafluoroethylene resin. The extrusion apparatus was fitted with a die to produce a nominally 12.7 mm diameter rod. An extrusion force of 7.3 metric tons was used to produce one 61 cm long rod every 90 seconds. Sustained operation was excellent in the production of 60 rods.

COMPARATIVE EXAMPLE B

The general procedure of Comparative Example A was repeated, except that the polytetrafluoroethylene lubricant was omitted from the polyimide resin. The extrusion had to be terminated after the second rod due to ram chatter and excess tonnage required for the ram operation.

COMPARATIVE EXAMPLE C

The general procedure of Comparative Example A was repeated, except that the resin blend used was one part of the polyimide blend of Comparative Example A and two parts of the resin of Comparative Example B, to give a polytetrafluoroethylene concentration in the resin blend of 0.067 weight percent. The extrusion was inoperable due to an excessive ram force of 18.1 metric tons.

COMPARATIVE EXAMPLE D

The general procedure of Comparative Example A was repeated, except that the resin blend used contained 15% graphite in addition to the polytetrafluoroethylene. Excellent sustained extrusion operation was obtained at a ram force of 6.4 to 7.3 metric tons. Forty-five rods were produced at a rate of one rod in 90 seconds.

COMPARATIVE EXAMPLE E

The general procedure of Comparative Example D was repeated, except that the polyimide resin blend contained no polytetrafluoroethylene. Extrusion was found to be impossible even at an excessive ram force of 18.1 metric tons.

COMPARATIVE EXAMPLE F

The general procedure of Comparative Example D was repeated, except that a die was used to prepare a 9.5 mm diameter rod. Using a 6.4 metric ton ram force, sustained extrusion was achieved to produce 33 rods at a rate of one rod in 90 seconds.

COMPARATIVE EXAMPLE G

The general procedure of Comparative Example F was repeated, except that the resin blend contained no polytetrafluoroethylene resin. The extrusion force was increased from 7.3 metric tons for the first rod to 10.9 metric tons for the third rod at which point the ram broke under excessive tonnage.

The tensile strength of the extruded rods prepared according to the present invention and the rods from Comparative Examples A, D and F, containing polytetrafuoroethylene resin, was tested. The rods were milled to a flat configuration and then tested according to ASTM STD. D-1708. The resulting data is summarized in the following Table.

TABLE

| Example No. | Graphite Wt. % | PTFE Resin Wt. % | Tensile Strength Psi | MPa |
| --- | --- | --- | --- | --- |
| 1 | 15% | 0 | 12600 | 87 |
| 2 | 0 | 0 | 15600 | 108 |
| 3 | 0 | 0 | 12200 | 84 |
| A | 0 | 0.20 | 8800 | 61 |
| D | 15% | 0.20 | 7700 | 53 |
| F | 15% | 0.20 | 7800 | 54 |

We claim:

1. In an apparatus for the ram-extrusion of non-melt fabricable polymeric resin comprising an extrusion chamber, a forming die at the end of the extrusion chamber, and a ram for forcing the resin from the extrsion chamber through the forming die, the improvement wherein the ram head in initial contact with the walls of the extrusion chamber and with the resin is consumable fluoropolymeric material which comprises at least about 10 percent fluoropolymer and wherein the forming die consecutively comprises (a) a compaction zone, (b) a back pressure zone, and (c) a relief zone.

2. An apparatus of claim 1 wherein the ram head consists of essentially of polytetrafluoroethylene.

3. An apparatus of claim 1 wherein the longitudinal dimension of the ram head in contact with the walls of the extrusion chamber is at least one-quarter inch.

4. An apparatus of claim 1 wherein the ram head consists essentially of at least about 10% polytetrafluoroethylene in a matrix of polyimide.

* * * * *